United States Patent
Yamamura et al.

(10) Patent No.: US 8,246,025 B2
(45) Date of Patent: Aug. 21, 2012

(54) VISE ASSEMBLY AND BENCH CIRCULAR SAWING MACHINE

(75) Inventors: Goh Yamamura, Anjo (JP); Toshiyuki Kani, Anjo (JP)

(73) Assignee: Makita Corporation, Anjo-shi (JP)

( * ) Notice: Subject to any disclaimer, the term of this patent is extended or adjusted under 35 U.S.C. 154(b) by 560 days.

(21) Appl. No.: 12/382,937

(22) Filed: Mar. 26, 2009

(65) Prior Publication Data

US 2009/0273131 A1 Nov. 5, 2009

(30) Foreign Application Priority Data

Apr. 30, 2008 (JP) ................. 2008-118914

(51) Int. Cl.
*B25B 1/20* (2006.01)
*B27B 5/18* (2006.01)
(52) U.S. Cl. ............ 269/45; 83/471.3; 269/71; 269/173
(58) Field of Classification Search .......... 269/45, 269/249, 173, 258, 71, 165, 174, 76, 164; 83/471.3
See application file for complete search history.

(56) References Cited

U.S. PATENT DOCUMENTS

| | | | | |
|---|---|---|---|---|
| 1,475,907 A | * | 11/1923 | Ani | ................. 269/173 |
| 2,271,532 A | * | 2/1942 | Allmendinger | ............... 269/76 |
| 2,450,994 A | | 10/1948 | Schaefer | |
| 3,245,289 A | | 4/1966 | Nelson | |
| 3,993,297 A | * | 11/1976 | Tokunaga | ............... 269/71 |
| 4,505,624 A | * | 3/1985 | Kelly, Jr. | ............... 269/71 |
| 6,024,350 A | * | 2/2000 | Price et al. | ............... 269/71 |
| 6,422,115 B1 | | 7/2002 | Shibata | |
| 7,721,632 B2 | * | 5/2010 | Chen | ............ 269/164 |
| 2004/0173065 A1 | | 9/2004 | Hill | |
| 2008/0106020 A1 | * | 5/2008 | Sherlock | ............... 269/71 |

FOREIGN PATENT DOCUMENTS

| | | |
|---|---|---|
| JP | A-6-71604 | 3/1994 |
| JP | A-2000-84770 | 3/2000 |

OTHER PUBLICATIONS

Sep. 2, 2009 Search Report issued in European Patent Application No. 09 00 4068.4.

* cited by examiner

*Primary Examiner* — Hadi Shakeri
(74) *Attorney, Agent, or Firm* — Oliff & Berridge, PLC

(57) ABSTRACT

A vise assembly includes a support rod standing on a base of a bench circular sawing machine, a first arm connected to the support rod and projecting frontward, a second arm of which a rear end portion is connected to a front end portion of the first arm in such a manner that the second arm is horizontally swingable and capable of being retained at any angular position, and a clamping rod disposed at a front end portion of the second arm, configured to be movable upward and downward, and capable of holding a workpiece placed in a cutting region. Optionally, the rear end portion of the second arm is movable upward and downward and capable of being retained at any vertical position.

11 Claims, 6 Drawing Sheets

VISE ASSEMBLY AND BENCH CIRCULAR SAWING MACHINE

BACKGROUND OF THE INVENTION

This application claims the entire benefit of Japanese Patent Application Number 2008-118914 filed on Apr. 30, 2008, the entirety of which is incorporated by reference.

TECHNICAL FIELD

This invention relates to a vise assembly for use in holding a workpiece in a bench circular sawing machine, and also to a bench circular sawing machine in which the vise assembly is provided.

BACKGROUND ART

In a bench circular sawing machine, its main body including a motor-driven rotary saw blade is provided above a base and configured to be movable upward and downward so that a workpiece placed on (or over) the base can be cut by lowering the main body. A vise assembly is used to hold the workpiece on the base during the cutting operation. Among vise assemblies of various types known in the art, such a vise assembly as disclosed for example in JP 6-71604 A comprises a vertical bar (support rod), a horizontal bar (arm) attached to the vertical bar and configured to be swingable horizontally on the vertical bar, and a bench screw (clamping rod) screwed vertically in an end portion of the horizontal bar. At a lower end of the bench screw, a clamping shoe for holding a workpiece is provided. In operation, by screwing down the bench screw, the clamping shoe at the lower end of the bench screw is lowered and pressed against a workpiece, to hold it from upward. The vise assembly configured like this may be disposed at a holder inserted in a guide part for supporting a workpiece at a side of the base as disclosed in JP 6-71604 A, or at a guide fence laid on the base for use in positioning a workpiece, or directly on the base.

However, in the aforementioned vise assembly, the position of the bench screw is fixed relative to the horizontal bar, and thus the position of the bench screw (holding position) can be adjusted only in a range of the arc-shaped trajectory along which the bench screw is movable according to the swinging motion of the horizontal bar. In this way, the range of selection of the holding position of the bench screw is inconveniently limited, which would in some instances require the vise assembly to change in its installation position; for example, when the main body is to be tilted sideways to perform a bevel cut, the vise assembly should be mounted on the side opposite to that to which the main body is tilted so as to avoid interference with the main body in operation. Thus, this limitation would impair the ease of use.

Under the circumstances, it would be desirable to provide a vise assembly which has more degrees of freedom or increased flexibility in selection of the holding position of a workpiece so that the ease of use can be increased, and a bench circular sawing machine in which such a vise assembly is provided.

The present invention has been made in an attempt to eliminate the above disadvantages, and illustrative, non-limiting embodiments of the present invention overcome the above disadvantages and other disadvantages not described above.

SUMMARY OF INVENTION

It is a first aspect of the present invention to provide a vise assembly comprising: a support rod standing on a base of a bench circular sawing machine; an arm comprises a first arm and a second arm, and the first arm is connected to the support rod and projecting frontward into a cutting region, and the second arm has a clamping rod disposed at a front end portion thereof. A rear end portion of the second arm is connected to a front end portion of the first arm in such a manner that the second arm is horizontally swingable and capable of being retained at any angular position.

According to a second aspect of the present invention, in the configuration according to the first aspect, preferably but not necessarily, the rear end portion of the second arm may be connected to the front end portion of the first arm in such a manner that the rear end portion of the second arm is movable upward and downward and capable of being retained at any vertical position. This additional feature can further increase the ease of operation.

According to a third aspect of the present invention, in the configuration according to either of the first and the second aspects, preferably but not necessarily, the support rod may be configured to be horizontally rotatable. This additional feature can further increase the degree of flexibility in setting or selecting the horizontal position of holding the clamping rod.

According to a fourth aspect of the present invention, the vise assembly according to any one of the first to the third aspects may, preferably but not necessarily, further comprise a slide rod vertically disposed at the rear end portion of the second arm, and a thumb screw provided to the front end portion of the first arm, wherein the slide rod is configured to be loosely provided to the front end portion of the first arm and to be retained at any position thereof by the thumb screw. This additional feature can ease the operation of changing the holding position.

According to a fifth aspect of the present invention, in the configuration according to the fourth aspect, preferably but not necessarily, the slide rod may have a portion to which the slide rod is loosely provided at the front end portion of the first arm, and the portion may have trimmed portions which are provided on front and rear surfaces of the slide rod to be axisymmetric to each other. This additional feature can serve to hold a workpiece with increased reliability.

It is a sixth aspect of the present invention to provide a vise assembly comprising: a support rod standing on a base of a bench circular sawing machine; an arm comprises a first arm and a second arm, and the first arm is connected to the support rod and projecting frontward into a cutting region, and the second arm has a clamping rod disposed at a front end portion thereof. A rear end portion of the second arm is connected to a front end portion of the first arm in such a manner that the rear end portion of the second arm is movable upward and downward and capable of being retained at any vertical position.

It is a seventh aspect of the present invention to provide a bench circular sawing machine comprising: a base; a main body including a motor-driven rotary saw blade, the main body being operable to be moved upward and downward above the base; and a vise assembly according to any one of the first to sixth aspects provided at the base.

Advantageous effects of some aspects and embodiments of the present invention as described above are as follows:

With the configurations according to the first, the sixth and the seventh aspects of the present invention, the degree of flexibility in selecting the holding positions can be increased and thus the ease of use can be improved.

According to the second aspect of the present invention, the advantage of the configuration according to the first aspect can be brought about as well, and besides, flexibility in selecting the holding positions can be expanded vertically, so that the ease of use can be expected to be further increased. In particular, since the second arm is configured to be movable upward and downward, the length of the clamping rod can be designed to be shorter so that upward protrusion of the assembly can be reduced and the possibility of danger of hitching something or catching an operator's hand on such protrusion during operation can be reduced.

According to the third aspect of the present invention, the advantage of the configuration according to the first or the second aspects can be enjoyed as well, and besides, by horizontally rotating or swiveling the first arm together with the support rod as being horizontally rotated, a finer adjustment of the horizontal holding position can be performed in combination of the horizontal rotation of the second arm. Therefore, flexibility in selection of the horizontal holding positions can be increased further.

According to the fourth aspect of the present invention, the advantage of the configuration according to any one of the first to the third aspects can be enjoyed as well, and besides, the holding position can be changed easily with the thumb screw.

According to the fifth aspect of the present invention, the advantage of the configuration according to the fourth aspect can be drawn as well, and besides, an undesired slip of the slide rod after holding down a workpiece can be prevented effectively, resulting in increasing reliability of holding the workpiece.

BRIEF DESCRIPTION OF THE DRAWINGS

The above aspects, other advantages and further features of the present invention will become more apparent by descriptions of in detail illustrative, non-limiting embodiments thereof with reference to the accompanying drawings, in which.

DESCRIPTION OF EMBODIMENTS

Exemplary embodiments of the present invention will be described hereinafter with reference to the accompanying drawings.

Figure 1:
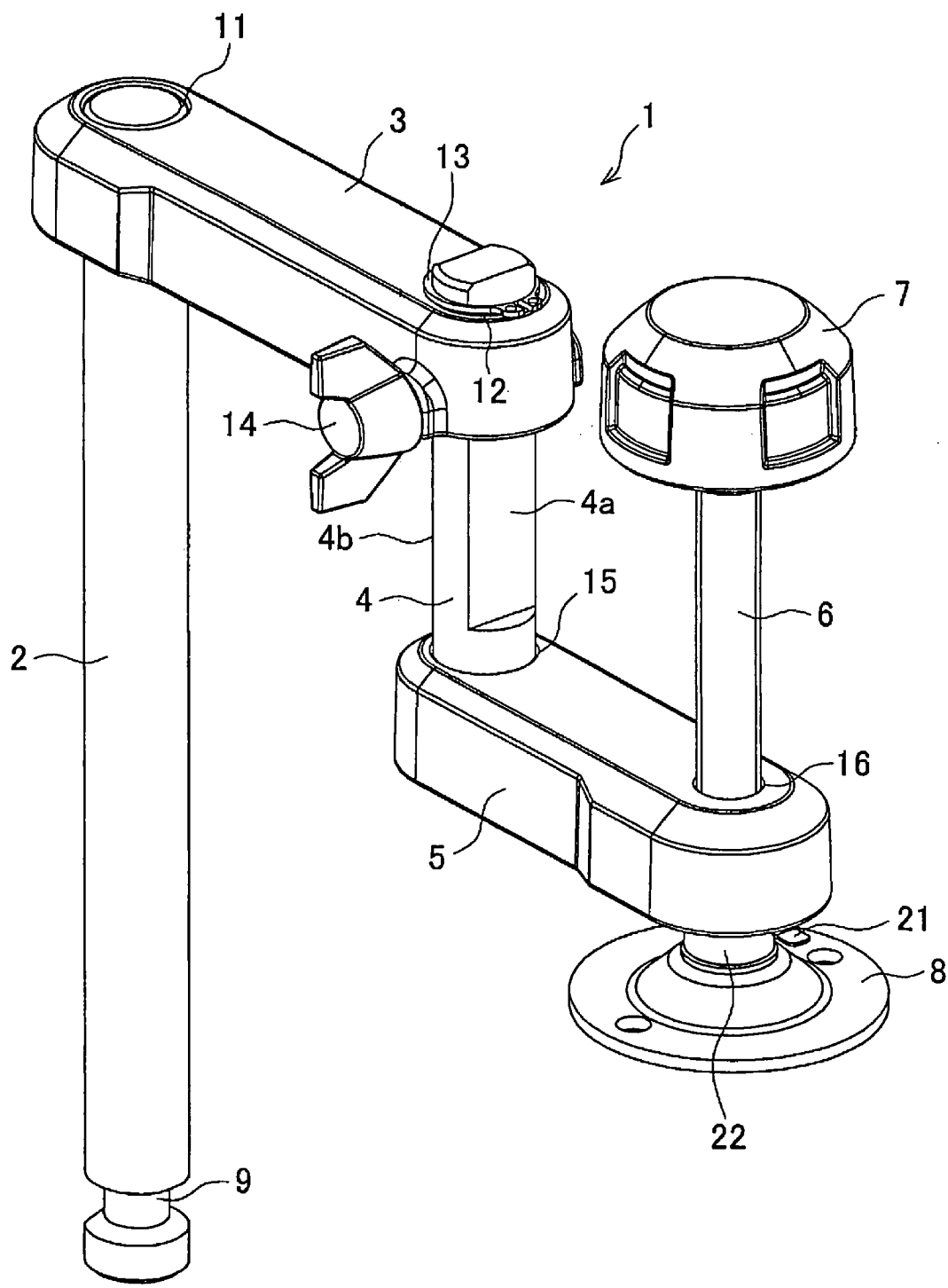
FIG. 1 is a perspective view of a vise assembly according to an exemplary embodiment of the present invention.
Figure 2A:
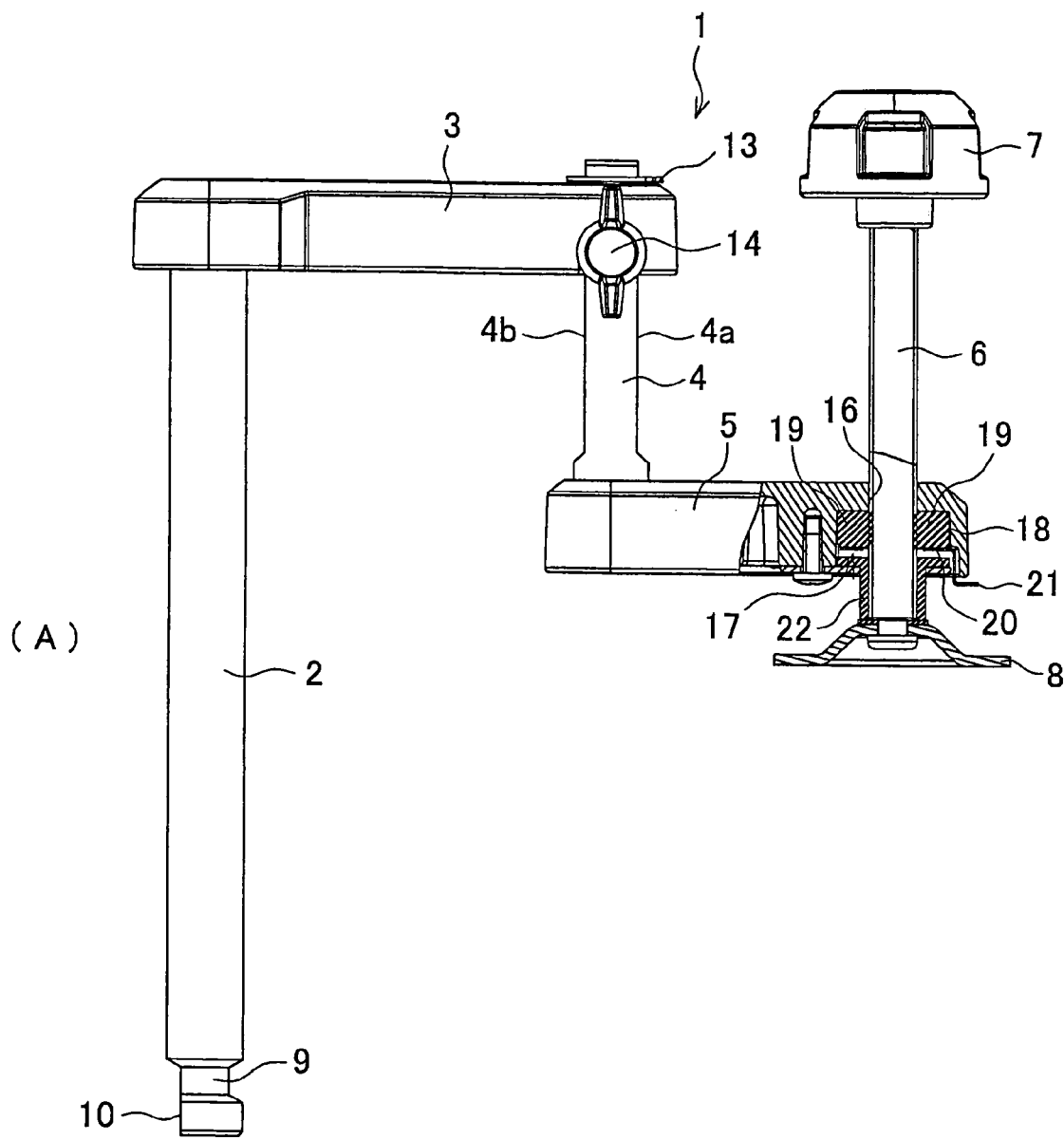
FIG. 2A is a side view of the vise assembly.
Figure 2B:
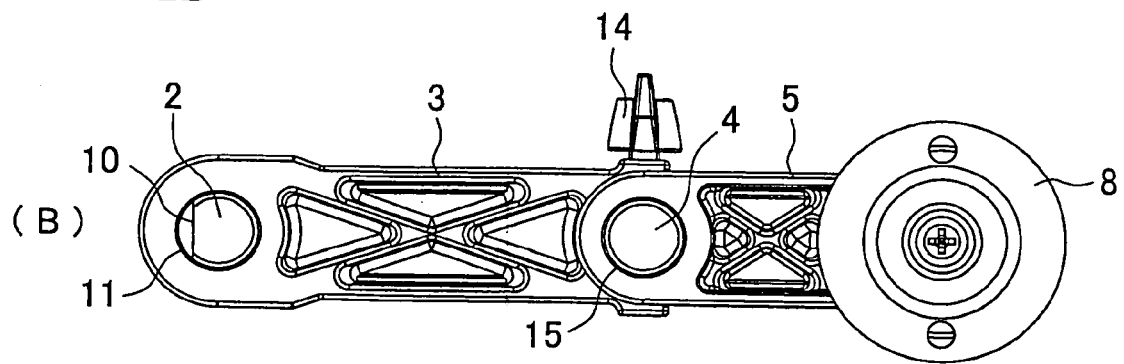
FIG. 2B is a bottom view of the vise assembly.

Referring now to FIGS. 1 and 2, a vise assembly 1 includes a support rod 2 vertically disposed and mounted with its lower end portion inserted in an opening provided in a base of a bench circular sawing machine that will be described later, a first arm 3 having one end portion connected to an upper end portion of the support rod 2 and projecting horizontally, a second arm 5 having one end portion connected to the other end portion of the first arm 3 via a slide rod 4 and projecting horizontally, and a clamping rod 6 disposed vertically at the other end portion of the second arm 5 and having an operation knob 7 disposed at an upper end thereof, and a disk-shaped clamping shoe 8 disposed at a lower end thereof.

The support rod 2 is a member shaped like a shaft having a circular cross section, and the lower end portion of the support rod 2 comprises a constriction portion 9 and a trimmed portion 10. The first arm 3 is connected to, and fixed integrally with, the support rod 2 by press-fitting of the upper end portion of the support rod 2 into a connecting hole 11 which is provided in the one end portion of the first arm 3.

The first arm 3 is a member shaped like a bar having an oblong figure elongated from a circle when viewed from above. The other end portion of the first arm 3 has a through hole 12, and the slide rod 4 is loosely provided in the through hole 12. A clip 13 is fitted on an upper end of the slide rod 4. In this way, the slide rod 4 is supported by the first arm 3 in a manner that renders the slide rod 4 movable upward and downward and horizontally rotatable relative to the first arm 3. At a side of the other end portion of the first arm 3, a thumb screw 14 is provided to be screwed from sideward to protrude into the through hole 12 when screwed in. When the thumb screw 14 is screwed into the first arm 3 with the slide rod 4 positioned at a desired height, the thumb screw 14 presses against the side surface of the slide rod 4 so that the slide rod 4 can thus be fixed in place at the desired height. Denoted by 4a, 4b are a pair of trimmed portions axisymmetric to each other with respect to the axis of the slide rod 4, which are formed by trimming the slide rod 4. The trimmed portions 4a, 4b are formed on front and rear surfaces of the slide rod 4, respectively.

Figure 3:
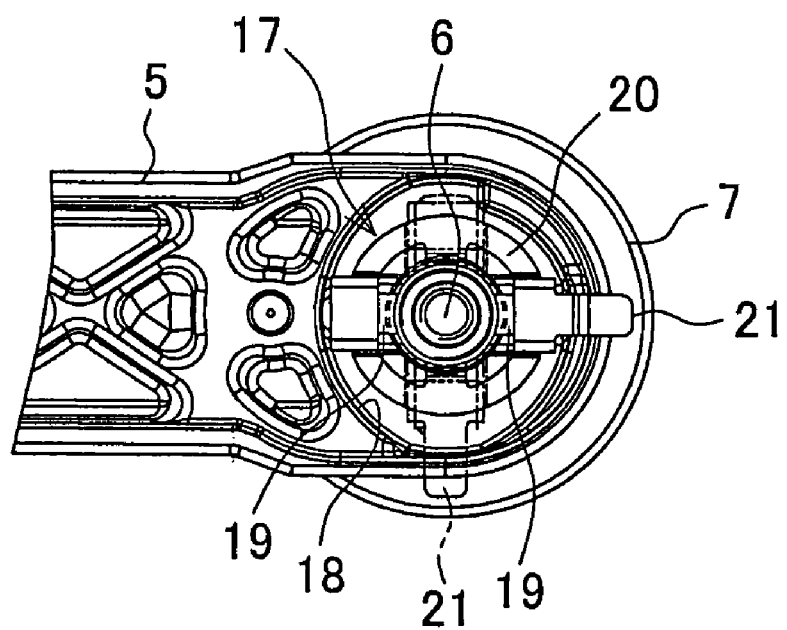
FIG. 3 is an explanatory drawing of a quick release mechanism.

The second arm 5 is also a member shaped like a bar having an oblong figure elongated from a circle when viewed from above. The second arm 5 is connected to, and fixed integrally with, the slide rod 4 by press-fitting of the lower end portion of the slide rod 4 into a through hole 15 which is provided in the one end portion of the second arm 5. The other end portion of the second arm 5 has a through hole 16, in which a threaded portion of the clamping rod 6 is loosely provided. In the second arm 5, a cam hole 18 is provided coaxially and contiguously with the through hole 16. As shown in FIG. 3, the cam hole 18 has an inner surface which circumferentially changes in distance from a center of the through hole 16. Inside the cam hole 18, a pair of release nuts 19 are provided so as to be slidable circumferentially along the inner surface of the cam hole 18 and each of which has an opposed surface provided with an internal thread engageable with the threaded portion of the clamping rod 6. The pair of release nuts 19 are held by a nut holder 20 in a manner that renders the pair of release nuts 19 radially movable while keeping the pair of release nuts 19 in positions axisymmetric to each other inside the cam hole 18. The cam hole 18, pair of release nuts 19 and nut holder 20 are arranged to constitute a quick release mechanism 17 for the clamping rod 6 in the second arm 5.

This quick release mechanism 17 has a structure similar to a known structure as disclosed in JP 2000-84770 A (corresponding U.S. patent document is also published under U.S. Pat. No. 6,422,115 B1, the contents of which is herein incorporated by reference in its entirety). By rotating the nut holder 20 between a position indicated by solid lines and a position indicated by chain double-dashed lines (see FIG. 3), the pair of release nuts 19 can circumferentially slide along the inner surface of the cam hole 18 so as to switch the position of the pair of release nuts 19 between a separate position in which the pair of release nuts 19 are separate from the clamping rod 6 and an engaging position in which each release nut 19 engage with the clamping rod 6.

The next description is directed to a method of operation for moving the pair of release nuts 19 between the separate position and the engaging position.

In order to move the pair of release nuts 19 to the separate position, first, the operation knob 7 is manipulated to rotate counterclockwise as viewed from above. Then, the nut holder 20 rotates counterclockwise together with the operation knob 7 by the friction between crests of the thread of the clamping rod 6 and the nut holder 20. Accordingly, each of the release nuts 19 held by the nut holder 20 is also caused to rotate counterclockwise, and moves to an angular position in which the pair of release nuts 19 are at a position most distant from the center (axis) of the through hole 16 within the cam hole 18. In this state, the position of each release nut 19 in the radial direction is set at a position with a small clearance remained at the outside. That is, the external thread of the clamping rod 6 and the internal thread of each release nut 19 slightly engage with each other. In this state, when the operation knob 7 is manipulated to move upward or downward, flanks (surfaces inclined in radial and axial directions) of the thread of the clamping rod 6 and flanks of the thread of each release nut 19 are slid, and thereby each release nut 19 moves to the separate position in which the release nut 19 is at the most distant position from the center of the through hole 16.

On the other hand, in order to move the pair of release nuts 19 to the engaging position, the operation knob 7 is manipulated to rotate clockwise. Then, as is the case during the counterclockwise rotation, the pair of release nuts 19 rotate clockwise in synchronization with the operation knob 7 together with the nut holder 20, so that each release nut 19 moves to an angular position in which the pair of release nuts 19 are at the nearest position to the center (axis) of the through hole 16 within the cam hole 18. In this way, each release nut 19 is pushed by the inner surface of the cam hole 18 to the engaging position nearest to the center (axis) of the through hole 16.

Denoted by 21 is a position indicator provided integrally with the nut holder 20 and configured to protrude from the second arm 5 to indicate an angular position of the nut holder 20. In other words, the indicator is to indicate which position, the separate position or the engaging position, the pair of release nuts 19 is currently positioned. Positions at the side of the second arm 5 corresponding to the two positions of the position indicator 21 may be labeled by texts or illustrations representing "release position" and "screw-down position", so that an operator can see them as a reference for convenience in turning the operation knob 7.

In this way, the clamping rod 6 in the separate position can freely move in its axial direction, whereas the clamping rod 6 in the engaging position is adjusted in its axial position and can perform screw feeds through the operation of turning the clamping rod 6. Denoted by 22 is a guide sleeve disposed under the cam hole 18, projecting downward from the second arm 5, and configured to guide an axial movement of the clamping rod 6. The guide sleeve 22 serves to allow the clamping rod 6 rendered freely movable axially by the quick release mechanism 17 to move upward and downward between a lower-limit position in which the operation knob 7 is in contact with an upper surface of the second arm 5 and an upper-limit position in which the clamping shoe 8 is in contact with the guide sleeve 22.

Next, with reference to FIGS. 4 and 5, a bench circular sawing machine according to an exemplary embodiment of the present invention in which the vise assembly 1 as described above is used will be described.

A slide circular saw 30 as one example of a bench circular sawing machine according to the present embodiment includes a base 31, a turntable 32 placed over the base 31 in such a manner that the turntable 32 can be horizontally rotated substantially at a center of the base 31, and a main body 34 including a rotary saw blade driven by a motor 35.

At a rear end (left side of FIG. 4) of the turntable 32, a joint part 36 is provided contiguously to the turntable 32. A lower end of a support arm 37 is rotatably joined to the joint part 36, and a holding sleeve 38 provided at an upper end of the support arm 37 is adapted to hold a pair of slide pipes 39 in such a manner that the pair of slide pipes 39 can slide frontward and rearward. Front ends of the slide pipes are connected in a pivot part 40. The main body 34 is pivoted on a pivot shaft 41 provided at the pivot part 40 in such a manner that the main body 34 can move upward and downward. The main body 34 is biased upward by a spring (not shown) in a normal state, and thus normally retained in an upper-limit position as shown in FIG. 4. Denoted by 42 is a handle, and denoted by 43 is a safety cover which is configured to cover the saw blade when the main body 34 is in the upper-limit position.

The base 31 has a pair of side portions 33 of which upper surfaces have the same height as that of the turntable 32, and a guide fence 44 is provided across the turntable 32 to bridge the side portions 33 disposed at right and left sides of the turntable 32. The guide fence 44 includes a pair of right and left fences 45, 46 each fixed to a corresponding side portion 33, and an arc-shaped roundabout part 47 connecting inner ends of the right and left fences 45, 46 together over the turntable 32. Front faces of the right and left fences 45, 46 are flush with each other to make up a guide surface 48 which is square to the upper surfaces of the turntable 32 and the side portions 33. The right and left fences 45, 46 have upper portions which are detachable and slidable to the right and to the left.

The left side portion 33 of the base 31 has an insertion hole 49 disposed rearward of the left fence 45. The insertion hole 49 is provided for the support rod 2 of the vise assembly 1 to be inserted therein. At a bottom of the inside of the insertion hole 49, an engageable portion 50 engageable with the constriction portion 9 of the support rod 2 as inserted is provided and protrudes rearward.

Figure 4:
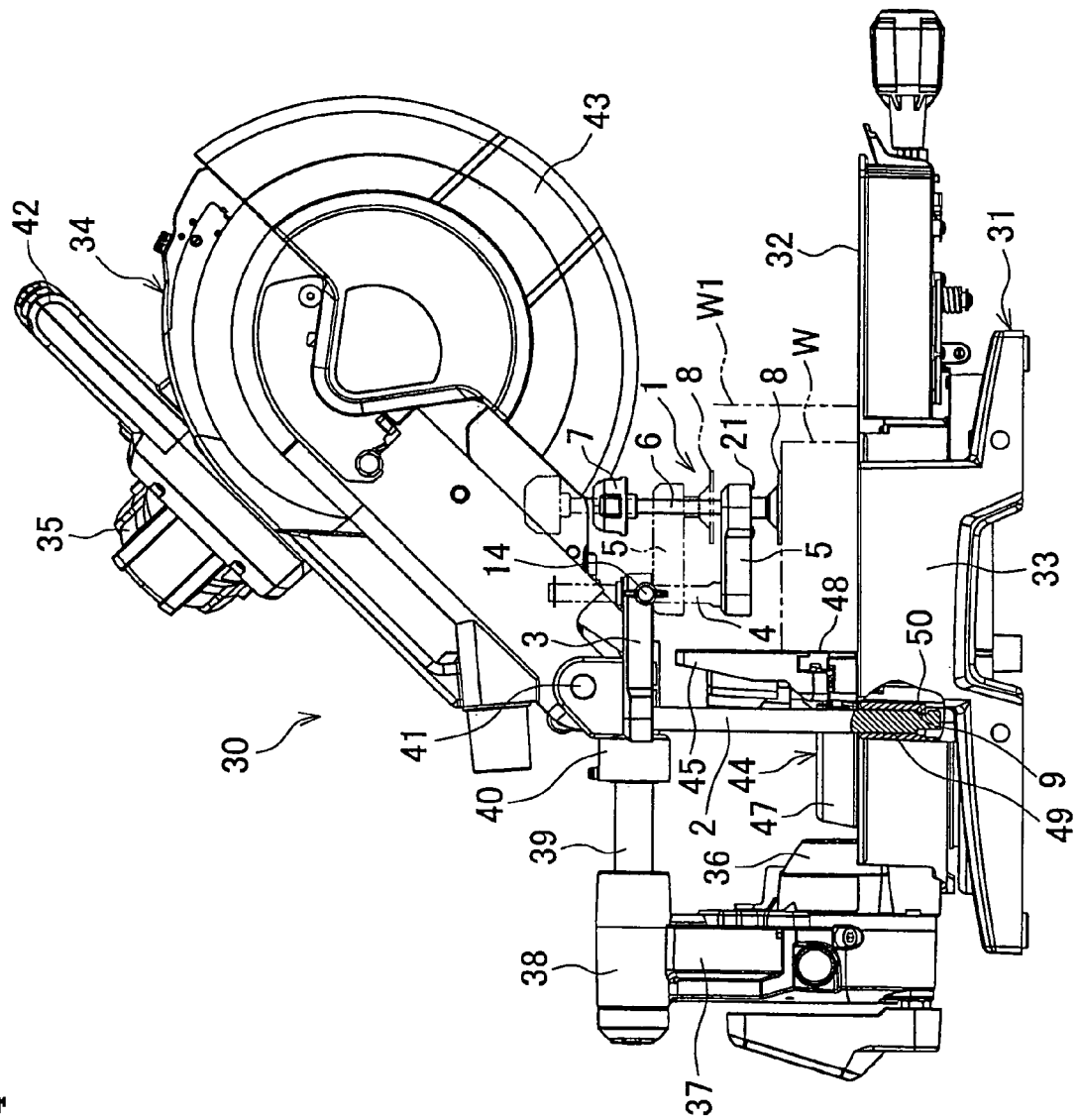
FIG. 4 is a side view of a slide circular saw as one example of a bench circular sawing machine according to an exemplary embodiment of the present invention.
Figure 5:
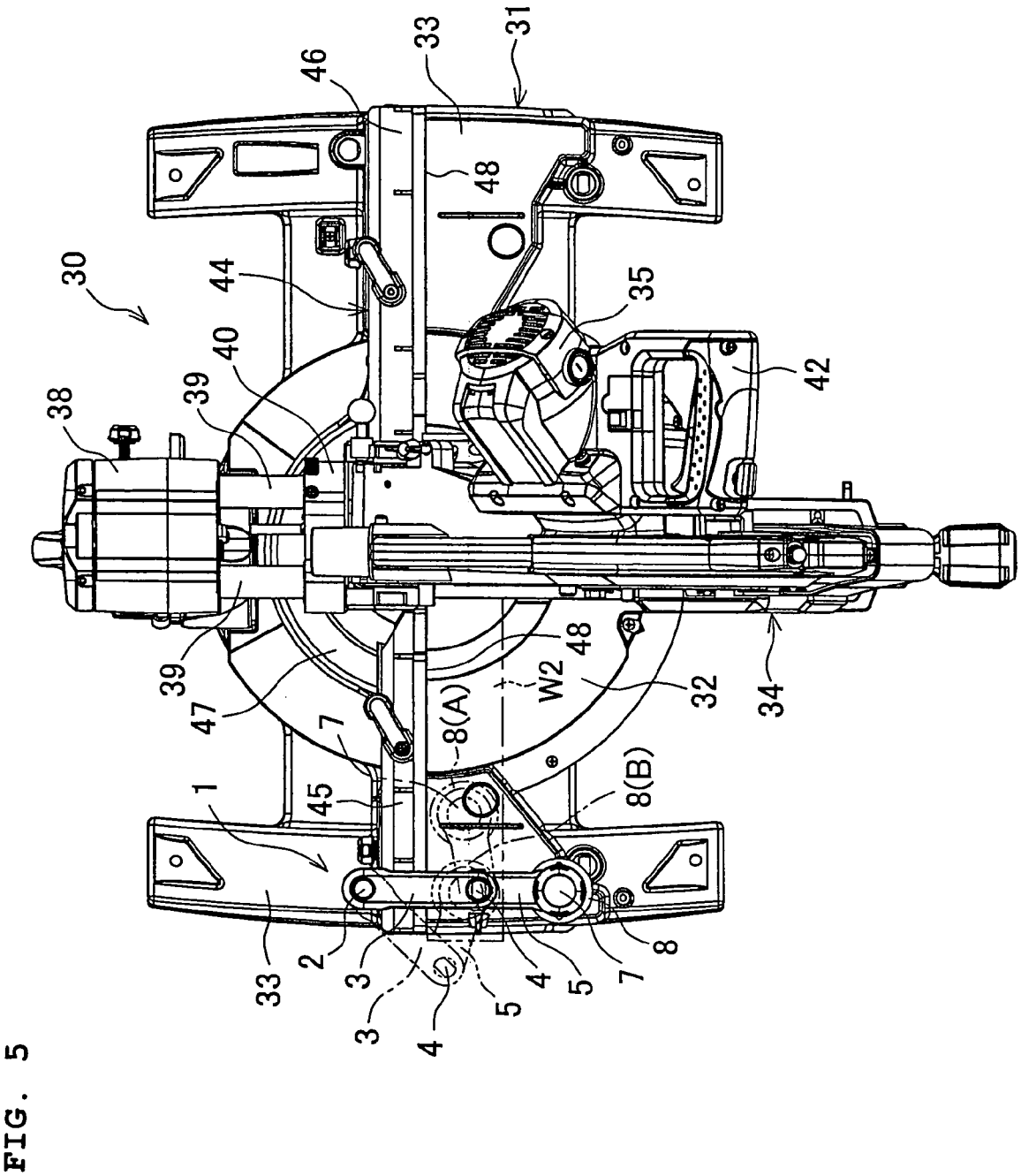
FIG. 5 is a plan view of the slide circular saw.

In this configuration, when the support rod 2 is inserted into the insertion hole 49, the engageable portion 50 engages with the constriction portion 9 as shown in FIG. 4, so that the support rod 2 is mounted in such a manner that the support rod 2 is prevented from coming off and allowed to rotate. In this state, the first arm 3 is disposed above the left fence 45 to protrude over the left fence 45 frontward into a cutting region (frontward of the guide fence 44 over the upper surfaces of the turntable 32 and the side portions 33), so that the second arm 5 and the clamping rod 6 are placed above the cutting region.

To hold a workpiece W in the cutting region, first, the workpiece W is pressed against the guide surface 48 of the guide fence 44 and positioned in place. Then the operation knob 7 is manipulated to turn the nut holder 20 to the left as viewed from above until the pair of release nuts 19 in the quick release mechanism 17 are moved to the separate position in which the release nuts 19 are separated from the clamping rod 6. Thereafter, while keeping the release nuts 19 in the separate position, the operation knob 7 is lowered to the position indicated by the solid lines in which the clamping shoe 8 at the lower end of the clamping rod 6 is brought into contact with the upper surface of the workpiece W. When the clamping shoe 8 comes in contact with the upper surface of the workpiece W, the operation knob 7 is manipulated again to turn the nut holder 20 to the right until the pair of release nuts 19 are moved to the engaging position in which the release nuts 19 engage with the clamping rod 6. Accordingly, when the clamping rod 6 is turned to the right by the operation knob 7, the clamping rod 6 is screwed downward so that the workpiece W can be clamped and held by the clamping shoe 8.

When a workpiece W1 of a great height is to be cut, the thumb screw 14 of the first arm 3 is loosened to render the slide rod 4 freely movable, and the slide rod 4 is slid upward; then, the second arm 5 and the clamping rod 6 also move upward as indicated by chain double-dashed lines in FIG. 4. From this position, the clamping rod 6 is operated to hold the workpiece W1 in such a manner as described above.

During the holding operation as described above, a reaction force exerted on the vise assembly 1 produces a load which tends to incline the slide rod 4 from a vertical axis thereof, however, since the inclination stress on the slide rod 4 brings side edges of the flat surfaces 4a, 4b of the slide rod 4 into contact with edges of the through hole 12 at four points (between the lower edge of the through hole 12 and right and left edges of the flat surface 4a, and between the upper edge of the through hole 12 and right and left edges of the flat surface 4b), the slip of the slide rod 4 fixed by the thumb screw 14 can be effectively prevented.

On the other hand, when a workpiece W2 having a small dimension in the front-rear direction is to be cut, similarly, the thumb screw 14 of the first arm 3 is loosened to render the slide rod 4 freely movable, and the second arm 5 is turned from inside toward the left fence 45. Thus, the clamping shoe 8 moves together with the clamping rod 6 to a position closer to the left fence 45, as indicated by chain double-dashed lines 8(A) in FIG. 5, so that the workpiece W2 can be clamped and held by the clamping shoe 8 disposed in this position. In this state, particularly, the workpiece W2 is held in a position closer to the saw blade, and thus the workpiece W2 can be held in a stable manner.

Figure 6:
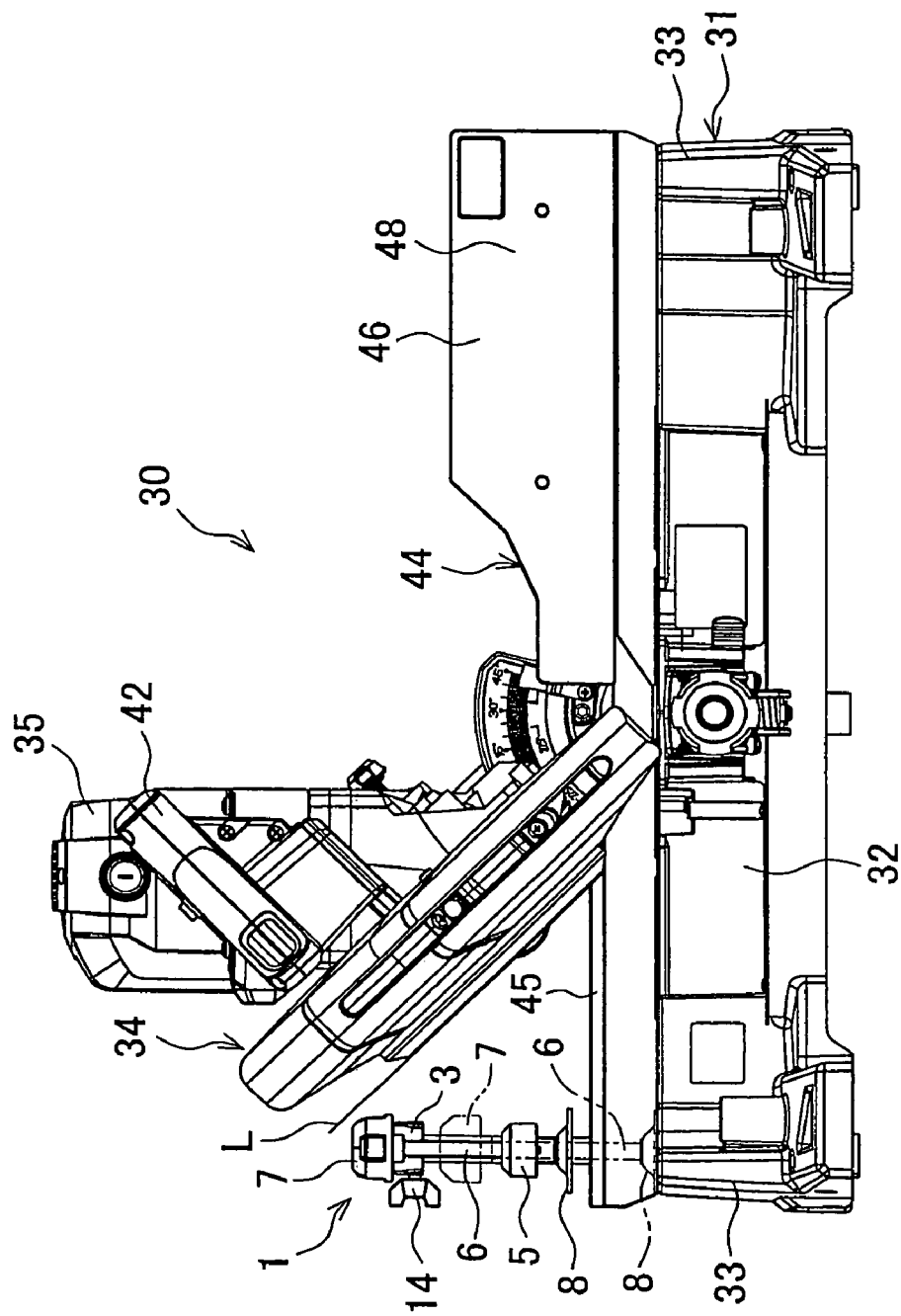
FIG. 6 is a front view of the slide circular saw with its main body tilted sideways.

When a bevel cut is performed with the main body 34 tilted to the left as shown in FIG. 6, the clamping shoe 8 disposed in the position indicated by chain double-dashed lines 8(A) would possibly interfere with a tilted plane L defined at the outermost surface of the main body 34. Therefore, the support rod 2 is turned to the right so as to turn the first arm 3 to the outside, and the second arm 5 is turned to the inside, as shown in FIG. 5, so that the first arm 3 and the second arm 5 are shaped like a letter L as indicated by chain double-dashed lines in FIG. 5. In this way, the clamping shoe 8 and the clamping rod 6 can be moved to a position closer to the left fence at the end of the base 31 without moving the clamping shoe 8 together with the clamping rod 6 to the inside as indicated by chain double-dashed lines 8(B) in FIG. 5. As a result, the workpiece W2 can be held in place without interfering with the tilted main body 34.

As described above, with the vise assembly 1 and the slide circular saw 30 according to the present embodiment, a workpiece W can be clamped and held in place in a position closer to the guide fence 44 and the saw blade, and thus the degree of flexibility in selecting the holding positions, as well as the ease of use, can be increased, because the arm of the vise assembly 1 is configured to include a first arm 3 and a second arm 5, and the first arm 3 is connected to the support rod 2 and projecting frontward, and the second arm 5 has a front end portion at which a clamping rod 6 is disposed wherein a rear end portion of the second arm 5 is connected to a front end portion of the first arm 3 in such a manner that the second arm 5 is horizontally swingable and capable of being retained at any angular position.

Moreover, according to the present embodiment, since the rear end portion of the second arm 5 is connected to the front end portion of the first arm 3 in such a manner that the rear end portion of the second arm 5 is movable upward and downward and capable of being retained at any vertical position, the flexibility in selection of the holding positions can be expanded vertically, so that the ease of use can be further increased. In particular, since the second arm 5 is configured to be movable upward and downward, the length of the clamping rod 6 can be designed to be shorter so that upward protrusion can be reduced and the possibility of danger of hitching something or catching an operator's hand on such protrusion during operation can be reduced.

Moreover, according to the present embodiment, since the support rod 2 standing on the base 31 is configured to be horizontally rotatable, the first arm 3 can be horizontally rotated together with the support rod 2 as horizontally rotated, and thus a finer adjustment of the horizontal holding position can be performed with the help of the horizontal rotation of the first arm 3 in combination of the horizontal rotation of the second arm 5. Therefore, the degree of flexibility in selecting the horizontal holding position can be increased furthermore.

Moreover, according to the present embodiment, since the slide rod 4 which is vertically disposed at the rear end portion of the second arm 5 is provided, and the slide rod 4 is configured to be loosely provided to the front end portion of the first arm 3 and to be retained at any position thereof by the thumb screw 14 provided to the front end portion of the first arm 3, the holding position can be changed easily horizontally and vertically.

In addition, according to the present embodiment, since the slide rod 4 has a portion to be loosely provided to the front end portion of the first arm 3, and the portion has a trimmed portion which is formed on front and rear surfaces of the slide rod 4 to be axisymmetric to each other, an undesired slip of the slide rod 4 after holding down a workpiece can be prevented effectively, so that the workpiece can be held down with increased reliability.

Although the above-described embodiment is configured to render the support rod horizontally rotatable to enable the first arm fixed to the support rod to be rotated horizontally, an alternative embodiment may be possible in which the support rod is configured to be fixed and immovable and the first arm is coupled to an upper end portion of the support rod in a horizontally rotatable manner. Alternatively, the support rod and the first arm may be both configured to be fixed and immovable while the second arm only is rendered horizontally rotatable. In this alternative embodiment, the first arm configured to be fixed and immovable would advantageously be unlikely to interfere with removing of the left fence.

Moreover, coupling of the first arm and the second arm may not be limited to those in accordance with the above-described embodiment in which the thumb screw is pressed against the slide rod, and various modifications and changes can be made where appropriate; for example, a pin provided in the first arm may be fitted in any of perforations or recesses provided in the slide rod so as to enable adjustment of the height, or the slide rod may be substituted with a plate-like rack, etc. The shapes of the first arm and the second arm may be changed and designed differently respectively, though substantially the same shape is applied thereto in the above-described embodiment; for example, one of the first and second arms may be shorter than the other.

Furthermore, the clamping rod to which a quick release mechanism is adopted in the above-described embodiment may be modified; for example, a simple structure with an external thread of the clamping rod screwed in an internal thread in the front end portion of the second arm may also be applicable so that the clamping rod can be screwed downward by an operation of turning the clamping rod. The shapes of the operation knob and/or the clamping shoe may also be modified where appropriate.

In addition, the support rod is designed to stand directly on the base in the above-described embodiment, but may stand on the guide fence or any other member so that the support rod stands on end indirectly at the base. Alternatively, as disclosed in the related-art document cited above in the Background Art section, a holder provided at an outside of the base may be employed to stand the support rod on end. A plurality of vise assemblies may be provided, for example, on the right side and on the left side.

In the above-described embodiment, the second arm is connected to the first arm in such a manner that the second arm is movable upward and downward and rotatable (swingable) horizontally. However, an alternative embodiment is conceivable in which a slide rod having a polygonal cross section can be fitted in a polygonal through hole contoured to fit the slide rod so that the second arm is movable only in the upward/downward direction. Another alternative embodiment conceivable is such that the slide rod is connected to a fixed position of the first arm in the axial direction of the slide rod so that the second arm is allowed only to make a swinging motion in the horizontal direction. As such, any vise assembly with the clamping position rendered adjustable in at least one of the upward/downward direction and the horizontal direction can achieve an improved flexibility in selecting the holding position, and thus fall within the scope of the present invention.

The bench circular sawing machine consistent with the present invention is not limited to the illustrated example embodied as a slide circular saw, but may include any bench circular sawing machine in which a vise assembly implemented according to the present invention can be employed; for example, a type with a non-slidable main body, a type with no bevel-cut capability, a type with a non-slidable guide fence, and other types of bench circular sawing machine may be the subject to which the present invention is applicable.

It is contemplated that various other modifications and changes may be made to the exemplary embodiments of the invention without departing from the scope of the embodiments of the present invention as defined in the appended claims.

The invention claimed is:

1. A vise assembly comprising:
   a support rod standing on a base of a bench circular sawing machine;
   an arm connected to the support rod and projecting frontward into a cutting region; and
   a clamping rod disposed at a front end portion of the arm, configured to be movable upward and downward, and capable of holding a workpiece placed in the cutting region, wherein
   the arm comprises a first arm and a second arm,
   the first arm and the second arm are parallel to each other,
   the second arm defines a through hole and a cam hole,
   the first arm and the second arm are located above the cutting region,
   a rear end portion of the first arm is pivotally fixed along a distal end of the support rod and projecting frontward,
   the second arm has a front end portion at which the clamping rod is disposed and a rear end portion connected to a front end portion of the first arm in such a manner that the second arm is horizontally swingable and capable of being retained at any angular position,
   the rear end portion of the second arm is movable upward and downward and capable of being retained at any vertical position,
   the clamping rod comprises a threaded portion at an entire circumference thereof and runs through the second arm with a through hole, and
   the cam hole has an inner surface which circumferentially changes in distance from a center of the through hole is provided inside the through hole,
   the vise assembly further comprises a pair of nuts and a nut holder, wherein
   the pair of nuts which are slidable circumferentially along the inner surface of the cam hole and each of which has an opposed surface provided with an internal thread engageable with the threaded portion of the clamping rod are held by the nut holder in a manner that renders the pair of nuts radially movable while keeping the pair of nuts in positions axisymmetric to each other inside the cam hole,
   the nut holder is configured such that an operation of turning the clamping rod causes the nut holder to turn, to thereby change in a phase of the pair of nuts, a selection can be made between a separate position and an engaging position,
   the separate position has the pair of nuts being most distant from the center of the through hole to render the clamping rod freely movable in an axial direction thereof,
   the engaging position has the pair of nuts being nearest to the center of the through hole to render the clamping rod adjustable in an axial position thereof through an operation of turning the clamping rod; and
   a position indicator provided at the nut holder and configured to protrude from the second arm to indicate an angular position of the nut holder.

2. The vise assembly according to claim 1, wherein the support rod is horizontally rotatable.

3. The vise assembly according to claim 2, wherein the support rod has a lower end portion to be flexibly fitted to an opening provided in the base, the lower end portion comprising a constriction portion and a trimmed portion.

4. The vise assembly according to claim 1, further comprising
   a slide rod vertically disposed at the rear end portion of the second arm, and a thumb screw provided to the front end portion of the first arm, wherein
   the slide rod is configured to be loosely provided to the front end portion of the first arm and to be retained at any position thereof by the thumb screw.

5. The vise assembly according to claim 4, wherein
   a portion of the slide rod is loosely provided to the front end portion of the first arm, and
   the portion of the slide rod has a trimmed portion which is formed on front and rear surfaces of the slide rod to be axisymmetric to each other.

6. The vise assembly according to claim 1, further comprising a disk-shaped clamping shoe provided at a lower end of the clamping rod.

7. The vise assembly according to claim 1, further comprising a guide sleeve provided in the second arm, disposed under the cam hole, and configured to allow the clamping rod to penetrate through the guide sleeve to guide an axial movement of the clamping rod.

8. The vise assembly according to claim 7, further comprising
   an operation knob disposed at an upper end of the clamping rod, wherein
   the clamping rod is movable upward and downward between a lower-limit position in which the operation knob is in contact with an upper surface of the second arm and an upper-limit position in which a clamping shoe provided at a lower end of the clamping rod is in contact with the guide sleeve.

9. A bench circular sawing machine comprising:
a base;
a main body including a motor-driven rotary saw blade, the main body being operable to be moved upward and downward above the base; and
a vise assembly according to claim 1 provided at the base.

10. The bench circular sawing machine according to claim 9, further comprising
a guide fence provided on the base, the guide fence having a guide surface to position a workpiece at a front side of the guide fence, wherein
the base has an insertion hole disposed rearward of the guide fence, for the support rod of the vise assembly to be inserted therein.

11. The bench circular sawing machine according to claim 10, wherein an engageable portion engageable with a constriction portion formed at a lower end portion of the support rod is provided inside the insertion hole.

* * * * *